United States Patent [19]

Constantinescu et al.

[11] 3,925,928

[45] Dec. 16, 1975

[54] AIR CONDITIONING, SOIL IRRIGATION, FERTILIZATION AND PEST-FIGHTING PLANT FOR USE IN GREENHOUSES

[75] Inventors: Petre Constantinescu; Nicolae Hristea; Speranta Blebea; Ieronim Hristea, all of Bucharest; Mihai Huniadi, Judetul Ilfov; Mircea Gabureanu, Bucharest, all of Romania

[73] Assignee: Intreprinderea 30 Decembrie, Judetul Ilfov, Romania

[22] Filed: July 2, 1974

[21] Appl. No.: 485,295

[30] Foreign Application Priority Data

July 23, 1973 Romania................................. 75562

[52] U.S. Cl........................................ 47/17; 98/33
[51] Int. Cl.²......................................... A01G 9/00
[58] Field of Search.................. 47/17, 2, 1.2, 58, 1; 98/33

[56] References Cited
UNITED STATES PATENTS

| | | |
|---|---|---|
| 1,222,648 | 4/1917 | Marks............................... 47/17 UX |
| 1,256,677 | 2/1918 | French............................. 47/17 UX |
| 1,827,530 | 10/1931 | Le Grand........................... 47/17 X |
| 1,870,329 | 8/1932 | Happel.................................. 47/17 |
| 2,193,911 | 3/1940 | Wright.................................. 47/17 |
| 3,274,730 | 9/1966 | Bose.................................. 47/17 UX |
| 3,446,272 | 5/1969 | Gaines.............................. 47/17 UX |
| 3,492,761 | 2/1970 | Taylor.................................. 47/17 |
| 3,727,345 | 4/1973 | Smith.................................... 47/2 |
| 3,810,327 | 5/1974 | Giansante........................ 47/17 UX |

*Primary Examiner*—Robert E. Bagwill
*Attorney, Agent, or Firm*—Karl F. Ross; Herbert Dubno

[57] ABSTRACT

A system for use in vegetable-growing greenhouses comprising a multiplicity of U-shaped ducts of precast reinforced concrete closed at the top by precast concrete slabs and supported overhead along the lines of pillars supporting the roof of the greenhouse. Each duct has an extremity near an external wall of the greenhouse and is provided with a distributing apparatus for supplying heated and/or cooled fresh air, humidified air, $CO_2$ containing air or air containing a pesticide to the duct which is there provided with pipes for irrigation or fertilizer-carrying water.

1 Claim, 11 Drawing Figures

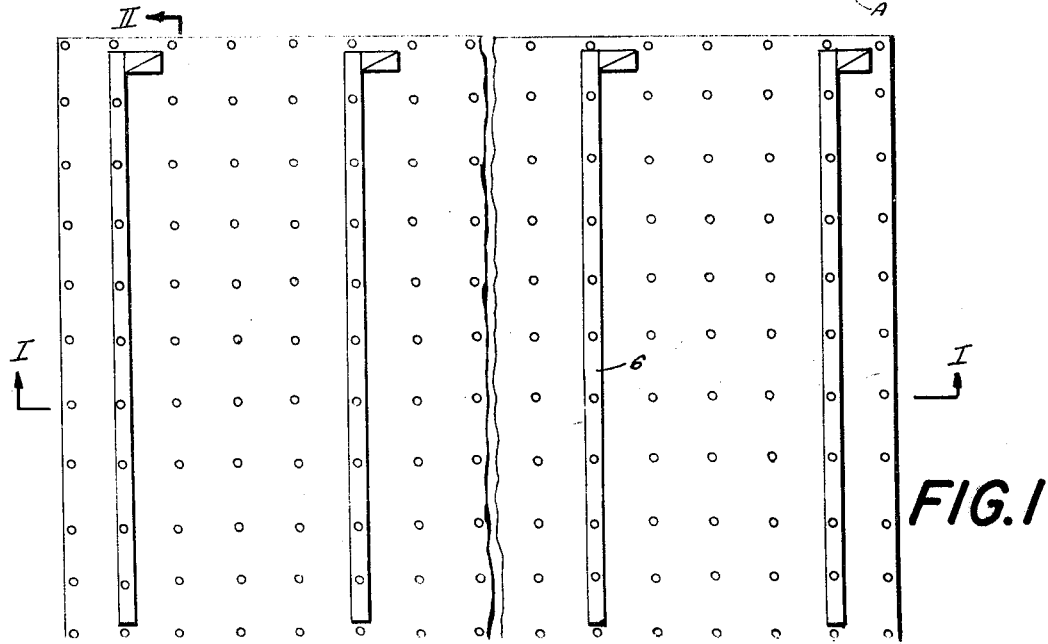
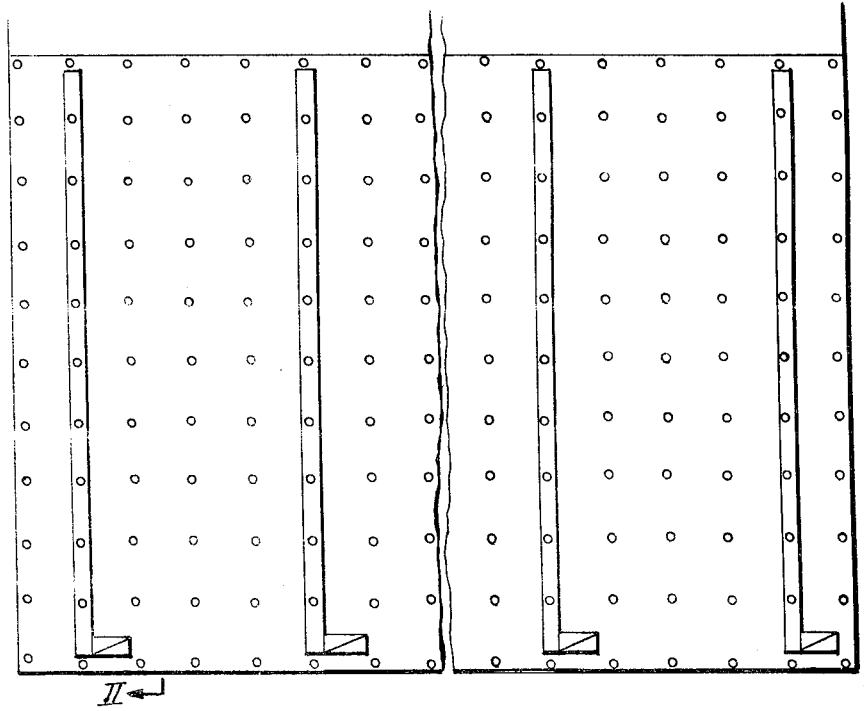

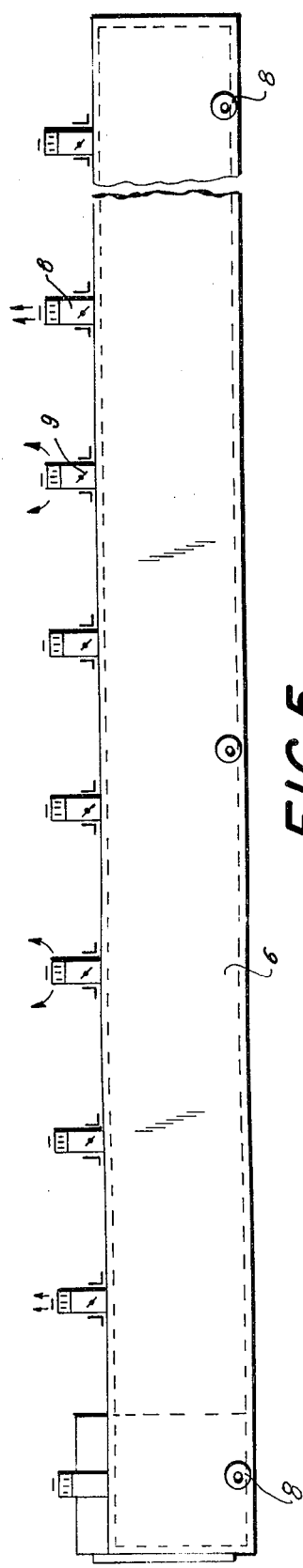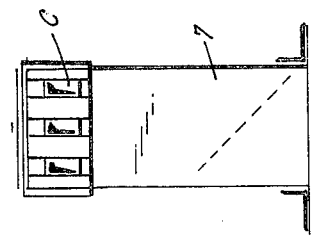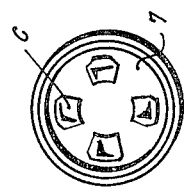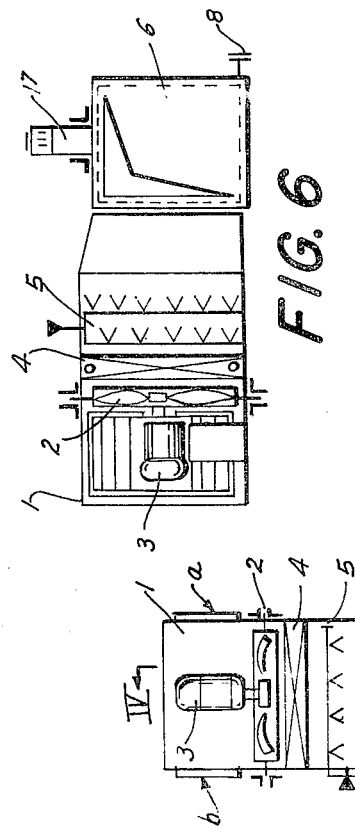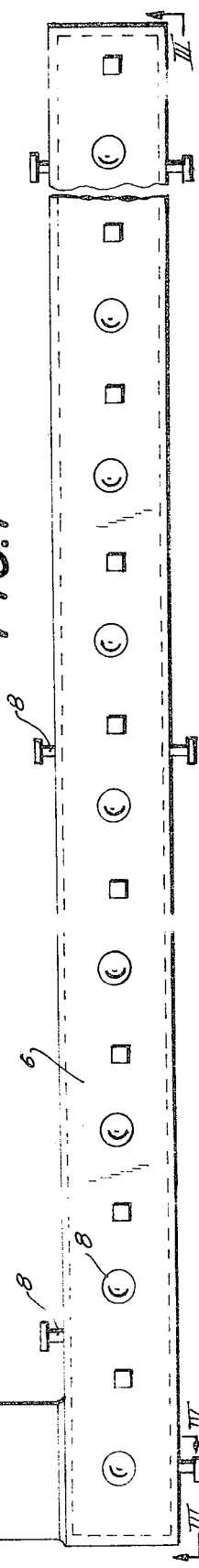

AIR CONDITIONING, SOIL IRRIGATION, FERTILIZATION AND PEST-FIGHTING PLANT FOR USE IN GREENHOUSES

The present invention relates to a system for use in a greenhouse and capable of maintaining a constant optimum plant-growth temperature, irrigating the plants, fertilizing the soil, and supplying carbon dioxide or pesticides to the plant-growth site.

It is already known to provide a greenhouse with an installation for maintaining the necessary temperatures, administering carbon dioxide and supplying pesticides, the installation utilizing a fan which conveys hot air through ducts enclosed in the skeleton of the greenhouse structure.

A disadvantage of such an installation, however, is that this duct network is very long, has numerous changes of direction, and complicates the construction of the greenhouse which also has the disadvantage that its use involves high energy cost for conveying the necessary fluids.

It is the object of the invention to provide an installation for the air conditioning, soil irrigation, fertilization and pest control of a plant-growth structure, namely a greenhouse, which avoids these short comings.

This object is achieved by providing the greenhouse with a plurality of U-shaped ducts of precast, reinforced light weight concrete, the ducts being closed at their tops by precast concrete slabs and being arranged overhead along lines of columns supporting the greenhouse roof.

Each duct has an inner extremity and an extremity proximal to an outer wall of the greenhouse and is provided at such external extremity with an apparatus for the distribution of heated and/or cooled air to the duct. The air may be previously humidified, may be enriched in $CO_2$, may be charged with air-carried pesticides in aerosol form, the distribution being controlled through blowing outlets provided with adjusting vanes distributing the air through adjustable slots on the cover.

The air-blowing air is either upwardly or sidewardly blown depending upon the season.

The distribution ducts are also provided with means for distributing irrigation water in droplets, for distributing a fertilizer solution, or the like, through both pressureless conduits and dropping pipes between the ducts.

The $CO_2$ injection is effected from a central station through pressurized water pipes using sprays which can also distribute pest-fighting emulsions from an emulsion preparing station. A fertilizer mixing station is used to prepare the fertilizer for distribution through the pressureless conduits and dripping pipes.

The above and other objects features and advantages of the present invention will become more readily apparent from the following description, reference being made to the accompanying drawing in which:

FIG. 1 is a plan view, partly in diagrammatic form and with the roof removed, of a greenhouse according to the present invention;

FIG. 2 is a longitudinal section taken along the line I—I of FIG. 1;

FIG. 3 is a transverse section taken along the line II—II of FIG. 1;

FIG. 4 is a plan view of one of the ducts of the installation of the FIGS. 1–3, drawn in an enlarged scale and showing parts of the distribution apparatus in diagrammatic form;

FIG. 5 is a side view of the duct of FIG. 4 taken in the direction of the arrow III;

FIG. 6 is a cross section of the duct taken along the line IV—IV of FIG. 4;

FIG. 7 is a side view of an air-blowing outlet used in conjunction with the duct of FIGS. 4–6;

FIG. 8 is a plan view of this outlet;

Figure 10:
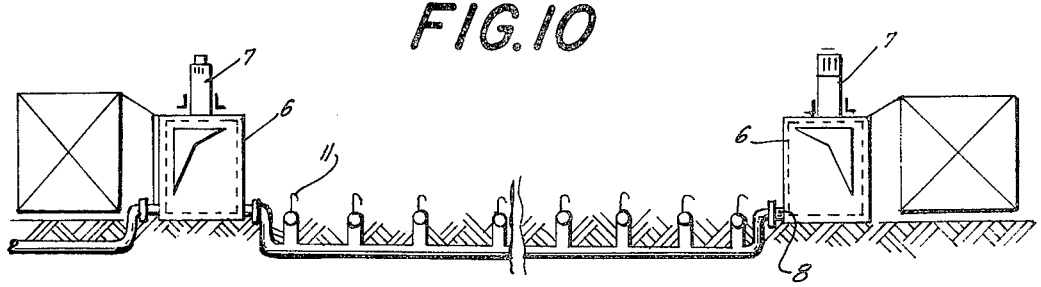
FIG. 10 is a cross section through the outgoing device taken along the line V—V of FIG. 9.
Figure 9:
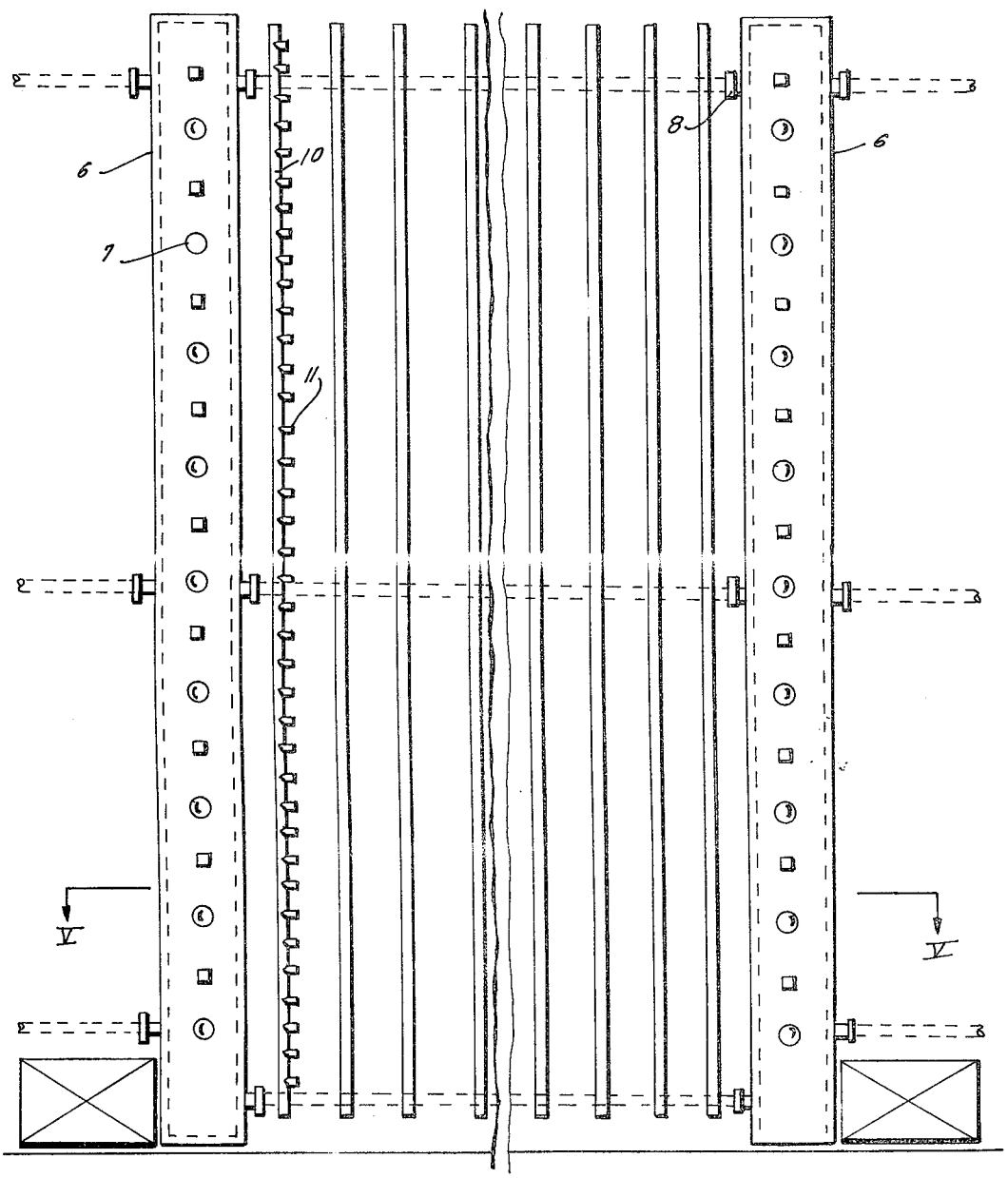
FIG. 9 is a plan view of the dropping device for soil irrigation.

As can be seen from FIGS. 1–3 the vegetable-growing installation of the present invention comprises a greenhouse structure having a plurality of rows of posts and outer walls and containing a number of distribution devices A disposed in the greenhouse so as to be able to supply control-composition, control-temperature or control-volume air thereto from the exterior without requiring ducted flow return.

Each of these apparatus A comprises a plenum 1 having two twin dampers $a$ and $b$, the former being open to allow fresh air into the system and the latter being open for recycling of air from within the greenhouse.

To this end the distribution unit A is provided adjacent an external wall of the greenhouse on the outer end of the respective duct 6, the other end (internal end) terminating within the interior of the greenhouse.

The distribution unit A also comprises an axial flow fan 2 driven by an electric motor 3 to displace the air drawn into the plenum 1 through the dampers $a$ or $b$ to a heater 4 capable of being operated with any heating medium. The air, upon traversing the heater 4, passes through a water spray 5 in which it is humidified and/or cooled and in which it can be enriched in $CO_2$ or charged with a prest-fighting agent in the form of an emulsion.

The air, so modified in composition and/or temperature (modified air) then passes through the duct 6 which is made of precasted U-section reinforced light weight concrete, the U-sections being closed at their upper sides by precast concrete slabs.

The ducts 6 are mounted overhead along respective rows of columns supporting the greenhouse roof.

On the upper faces of the ducts, as can be seen from FIGS. 7 and 8, there are arranged air-discharge outlets 7, each provided with a control valve capable of distributing modified or unmodified air selectively upwardly or laterally outwardly through adjustable slots $c$. At the lower side of the ducts 6, there are provided flanged connectors 8 adapted to be tied to pressureless water pipes or conduits 9 so that a uniform water level is maintained throughout the entire plant. The pipes 9 are charged with irrigation water or fertilizer-carrier water and communicate with water-distribution pipes 10 provided with dripping pipes 11 arranged along the rows of plants. The water level in the ducts corresponds to the level in the dripping pipes 11.

Figure 11:
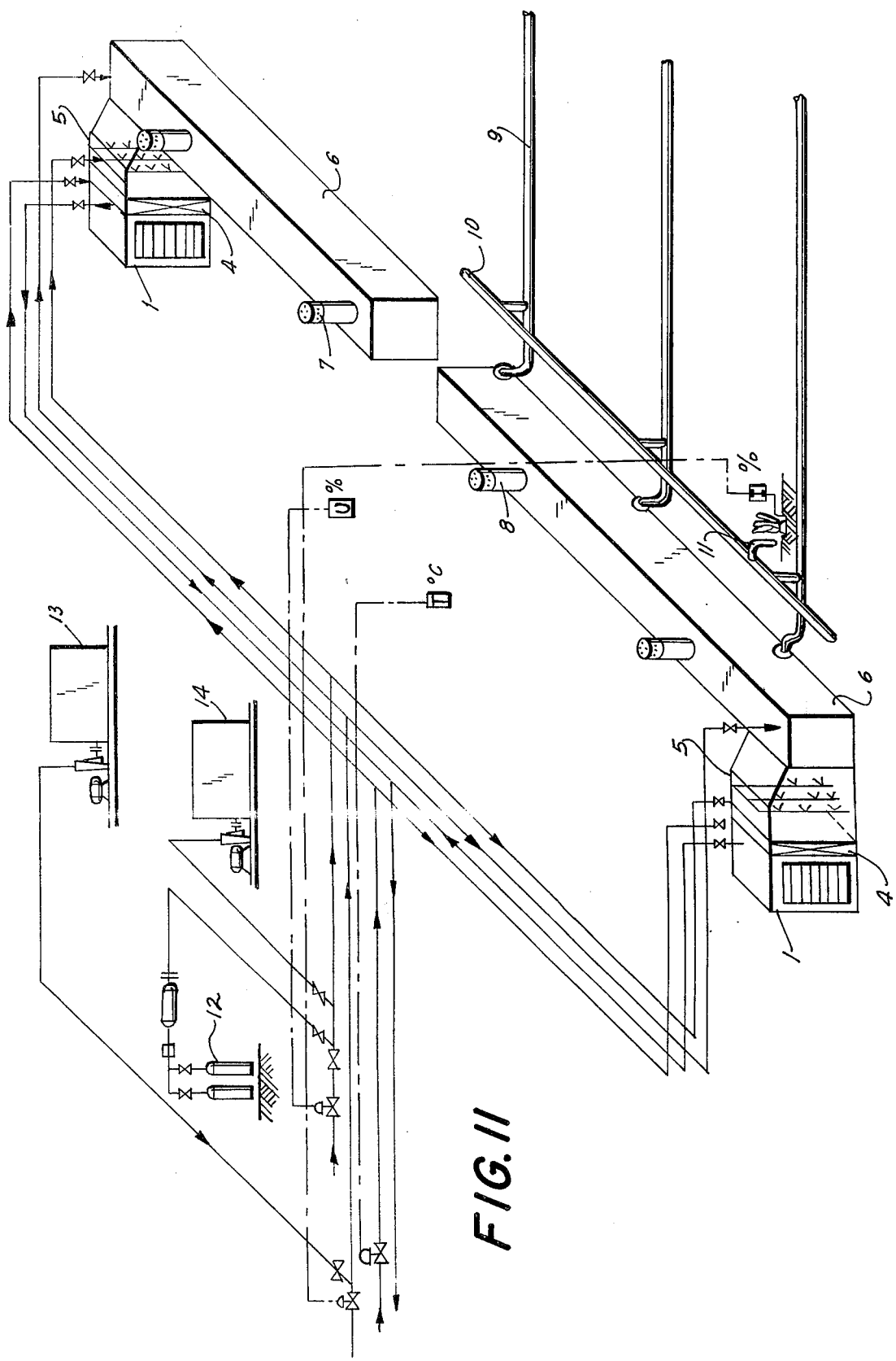
FIG. 11 is a diagrammatic perspective view of the plant embodying the invention.

A central station 12 (FIG. 11) feeds carbon dioxide to the spray device 5 to enrich the air subjected to the spray with carbon dioxide concurrently with humidification or cooling. Antipest-aerosol is supplied to the spray 5 from a fixed or movable station 13 at which the anti-pest emulsion is prepared.

Fertilizer-carrying water is supplied from a station 14 to the distribution pipes 9 in the form of a fertilizer emulsion.

The plant has the advantages that it is multifunctional, permits the environmental conditions to be readily adjusted in a correlation with solar radiation intensity, permits fertilization and irrigation in addition to atmosphere control, and brings about an intimate air-water mixture which diminishes problems with pests which arise with excessive humidity. Plant diseases may be eliminated simultaneously and a uniform distribution of carbon dioxide is attained with a low utilization in fuel, power and equipment.

We claim:

1. In a greenhouse having a roof supported on rows of pillars, the improvement which comprises an environmental control installation, said installation comprising a plurality of elongated air-distribution ducts extending toward the interior of the greenhouse over an end of each duct proximal to an external wall;

a respective air-displacement unit mounted on said end of a respective duct, each of said ducts comprising a U-section light weight reinforced concrete member and precast concrete slabs covering said members, said members being disposed overhead along respective rows of said pillars;

a respective spray means disposed between each of said units and a respective duct for spraying water into the air displaced along the duct, said ducts each being formed with outlets along an upper side thereof, and means for selectively directing the air from said outlets upwardly and laterally;

a $CO_2$ injection station connected with said spray means for injecting carbon dioxide into the water sprayed into the air displaced by said units;

an emulsion preparing station connected with said units for distributing an anti-pest emulsion into the air displaced thereby; and a network of pressureless distribution conduits connecting said ducts and supplying same with irrigation and fertilizer liquid, said conduits being formed with dropping pipes for dripping liquid from said distribution conduits.

* * * * *